United States Patent [19]
Zhang

[11] Patent Number: 5,936,294
[45] Date of Patent: *Aug. 10, 1999

[54] OPTICAL SEMICONDUCTOR COMPONENT AND METHOD OF FABRICATION

[75] Inventor: Zuoying Lisa Zhang, Gilbert, Ariz.

[73] Assignee: Motorola, Inc., Schaumburg, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 08/654,514

[22] Filed: May 28, 1996

[51] Int. Cl.[6] .................................................. H01L 31/00
[52] U.S. Cl. ...................... 257/435; 257/415; 73/514.19; 73/514.24; 73/514.26; 73/777
[58] Field of Search ..................................... 257/415, 414, 257/416, 462, 461, 435; 367/149; 73/514.26, 514.16, 514.19, 514.21, 514.36, 777

[56] References Cited

U.S. PATENT DOCUMENTS

| | | | |
|---|---|---|---|
| 4,322,829 | 3/1982 | Davis, Jr. et al. | 307/178 |
| 4,428,234 | 1/1984 | Walker | 73/517 |
| 4,719,800 | 1/1988 | Moser | 73/514.26 |
| 4,792,931 | 12/1988 | Nishida et al. | 367/149 |
| 4,879,470 | 11/1989 | Sugawa et al. | 257/462 |
| 5,428,996 | 7/1995 | Abbink et al. | 73/514 |
| 5,488,864 | 2/1996 | Stephan | 73/514.32 |
| 5,559,358 | 9/1996 | Burns et al. | 257/431 |

FOREIGN PATENT DOCUMENTS

| | | |
|---|---|---|
| 0594182 | 4/1994 | European Pat. Off. . |
| 2094974 | 9/1982 | United Kingdom . |

OTHER PUBLICATIONS

Ebrahim Abbaspour–Sani et al., "A Novel Optical Accelerometer", IEEE Electron Device Letters, vol. 16, No. 5, May 1995, pp. 166–168.

N.C. Tien, et al. "Impact–actuated linear microvibromotor for micro–optical systems on silicon", IEDM, 1994, pp. 6.7.1–6.7.3.

William Nunley et al., Infrared Optoelectronics Devices and Applications, "Mechanical Considerations" 1987, Chapter 11, pp. 184–189.

*Primary Examiner*—Sara Crane
*Attorney, Agent, or Firm*—George C. Chen

[57] ABSTRACT

An optical semiconductor component (10) includes a substrate (11) having a surface (12), a photodetector (13) supported by the substrate (11), and a seismic mass (21) overlying the surface (12) of the substrate (11) and overlying a portion of the photodetector (13). The seismic mass (21) has a hole (22) overlying a base region (32) of the photodetector (13) wherein the seismic mass (21) is movable relative to the substrate (11) and the photodetector (13).

18 Claims, 3 Drawing Sheets

OPTICAL SEMICONDUCTOR COMPONENT AND METHOD OF FABRICATION

BACKGROUND OF THE INVENTION

This invention relates, in general, to semiconductors, and more particularly, to optical semiconductor components.

Conventionally micromachined accelerometers have a movable seismic mass that typically serves as an electrode for a motion sensing capacitor. The movable seismic mass is deflected toward or away from a stationary electrode in response to an acceleration. The measured capacitance between the seismic mass and the stationary electrode is dependent upon numerous factors including the distance between the seismic mass and the stationary electrode. Accordingly, in order to use the measured capacitance to accurately determine acceleration, the seismic mass should be planar so that a perpendicular distance between a portion of the seismic mass and a portion of the stationary electrode is the same as another perpendicular distance between another portion of the seismic mass and another portion the stationary electrode. However, a planar seismic mass is difficult to manufacture because of the topography underlying the seismic mass and also because of the internal mechanical stress of the seismic mass.

The sensitivity of the conventional micromachined accelerometer is also dependent upon the area of the seismic mass that overlaps the stationary electrode and is further dependent upon the magnitude of the measured capacitance. A larger measured capacitance can be used to increase the sensitivity of the conventional accelerometer, but a larger measured capacitance also increases the probability of electrical latching between the stationary electrode and the seismic mass wherein the electrical latching damages the accelerometer.

Therefore, a need exists for an improved micromachined accelerometer. The accelerometer should not be too sensitive to the planarity of a seismic mass and should not suffer from electrical latching.

DETAILED DESCRIPTION OF THE DRAWINGS

Figure 1:
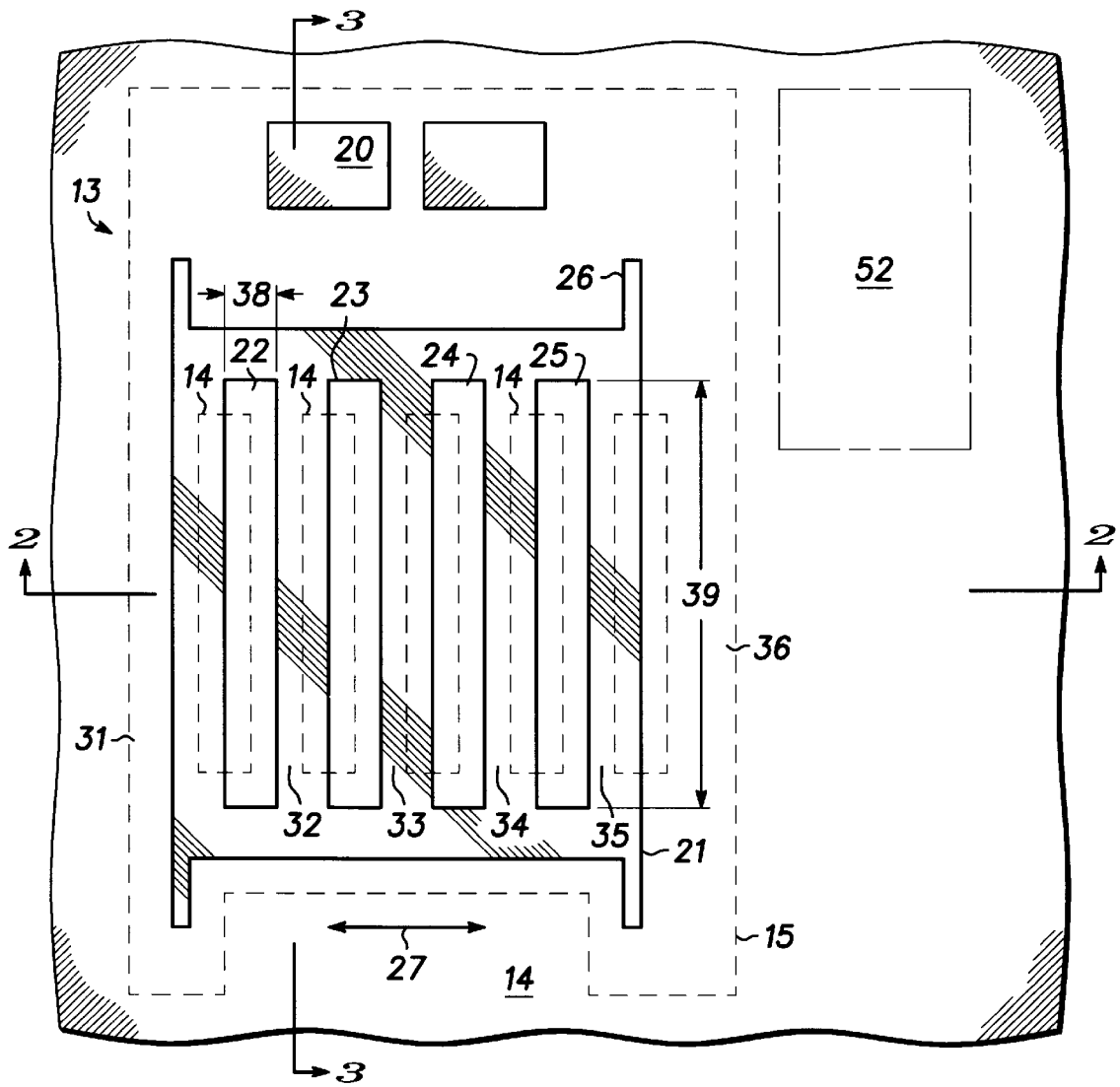
FIG. 1 illustrates a top view of an embodiment of an optical semiconductor component in accordance with the present invention.
Figure 2:
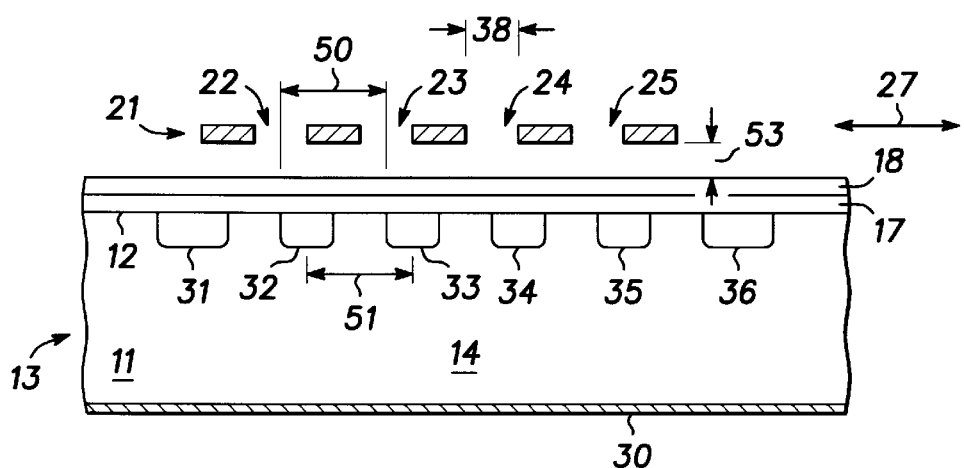
FIG. 2 portrays a cross-sectional view of the optical semiconductor component taken along reference line 2—2 of FIG. 1.
Figure 3:
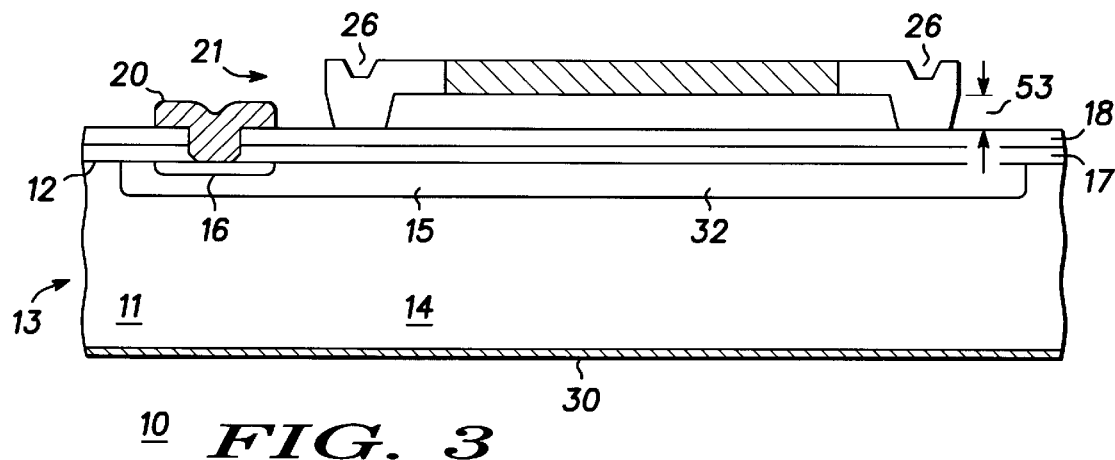
FIG. 3 depicts a cross-sectional view of the optical semiconductor component taken along reference line 3—3 of FIG. 1.

FIG. 1 illustrates a top view of an embodiment of an optical semiconductor component 10. FIG. 2 portrays a cross-sectional view of component 10 taken along reference line 2—2 of FIG. 1, and FIG. 3 depicts a cross-sectional view of component 10 taken along reference line 3—3 of FIG. 1. It is understood that the same reference numerals are used in the figures to denote the same elements.

As shown in FIGS. 1, 2, and 3, component 10 includes a seismic mass 21 overlying a portion of a photodetector 13. Component 10 serves as a sensor that uses the motion of seismic mass 21 to detect acceleration as explained hereinafter. Component 10 can optionally include an integrated circuit 52 (FIG. 1) to form an integrated sensor component. Because circuit 52 can have many different structures, the depicted structure is only for the purpose of illustrating circuit 52, which is located adjacent to photodetector 13 and which is also electrically coupled to receive electrical signals from photodetector 13. Photodetector 13 and circuit 52 are supported by or are formed in a substrate 11 (FIGS. 2 and 3), which has a surface 12. Electrically insulating layers or dielectric layers 17 and 18 (FIGS. 2 and 3) overlie surface 12 and overlie a portion of photodetector 13.

Photodetector 13 is depicted in FIGS. 1, 2, and 3 as a vertical bipolar transistor. However, it is understood that photodetector 13 can be a different light sensitive device such as, for example, a photodiode or a photomultiplier. Photodetector 13 has a collector region 14 in substrate 11 wherein collector region 14 has a first conductivity type and a first doping level. Photodetector 13 also has a base region 15 located in or adjacent to collector region 14 wherein base region 15 has a second conductivity type different from the first conductivity type. As an example, if collector region 14 is n-type, then base region 15 can be p-type. Base region 15 also has a second doping level that can be greater than the first doping level of collector region 14 in order to improve the electrical performance of photodetector 13. Although base region 15 can be comprised of any appropriate number of base stripes or regions, base region 15 is depicted to have a plurality of base stripes or regions 31, 32, 33, 34, 35, and 36 in FIGS. 1 and 2. Base region 15 and collector region 14 are located along different portions of surface 12 of substrate 11.

Seismic mass 21 is a movable structure that is used as an optical shutter. Seismic mass 21 is coupled to and mounted over a portion of substrate 11 and dielectric layers 17 and 18. Seismic mass 21 is movable relative to photodetector 13, substrate 11, and dielectric layers 17 and 18, and seismic mass 21 has cantilever beams or arms 26 that support or suspend a portion of seismic mass 21 over portions of surface 12 of substrate 11, base region 15, and collector region 14.

In FIGS. 1 and 2, seismic mass 21 is depicted to have a plurality of holes 22, 23, 24, and 25, which are used to permit light to shine on portions of base regions 32, 33, 34, and 35 to generate an output current. However, seismic mass 21 can have any desirable number of holes. Furthermore, although holes 22, 23, 24, and 25 are illustrated as having a rectangular cross-section, the hole or holes of seismic mass 21 can have other suitable cross-sectional shapes such as, for example, circles or ovals. Each of holes 22, 23, 24, and 25 overlie different portions of collector region 14, and each of holes 22, 23, 24, and 25 overlie a portion of a different one of base regions 32, 33, 34, and 35. More specifically, as shown in FIG. 2, hole 22 of seismic mass 21 overlies a portion of collector region 14 and a portion of base region 32, and hole 23 overlies a different portion of collector region 14 and overlies a portion of base region 33. Furthermore, hole 24 overlies yet another portion of collector region 14 and a portion of base region 34, and hole 25 overlies still another portion of collector region 14 and a portion of base region 35.

To facilitate the alignment between seismic mass 21 and photodetector 13 as explained hereinafter, holes 22, 23, 24, and 25 of seismic mass 21 are preferably substantially the same size and shape. Each of holes 22, 23, 24, and 25 preferably have a width 38 (FIGS. 1 and 2) and a length 39 (FIG. 1) that are individually greater than a distance 53 (FIGS. 2 and 3) that separates holes 22, 23, 24, and 25 of seismic mass 21 from dielectric layer 18. As an example, distance 53 can be approximately two microns, and width 38 can be approximately three microns wherein length 39 is greater than width 38.

For proper alignment between seismic mass 21 and photodetector 13, a distance from a center of one of holes 22, 23, 24, or 25 to a center of an adjacent one of holes 22, 23, 24, or 25 is preferably approximately equal to a distance from a center of one of base regions 32, 33, 34, or 35 to a center of an adjacent one of base regions 32, 33, 34, or 35. For example, in FIG. 2, a distance 50 between the centers of holes 22 and 23 is preferably approximately equal to a distance 51 between the centers of base regions 32 and 33 wherein holes 22 and 23 are located adjacent to each other and wherein base regions 32 and 33 are located adjacent to each other.

Figure 4:
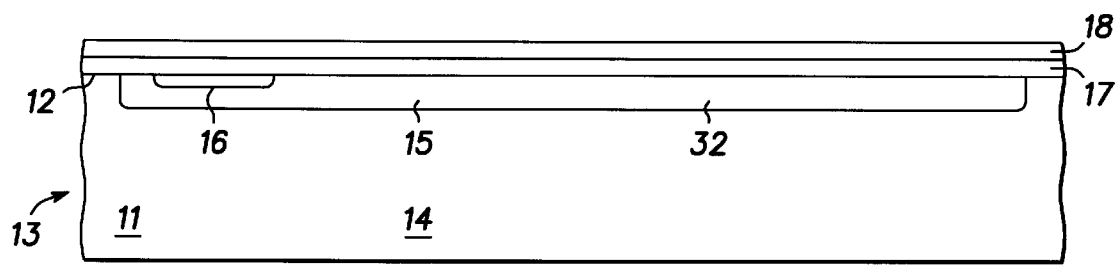
FIGS. 4 and 5 illustrate cross-sectional views of the optical semiconductor component during fabrication taken along reference line 3—3 of FIG. 1.
Figure 5:
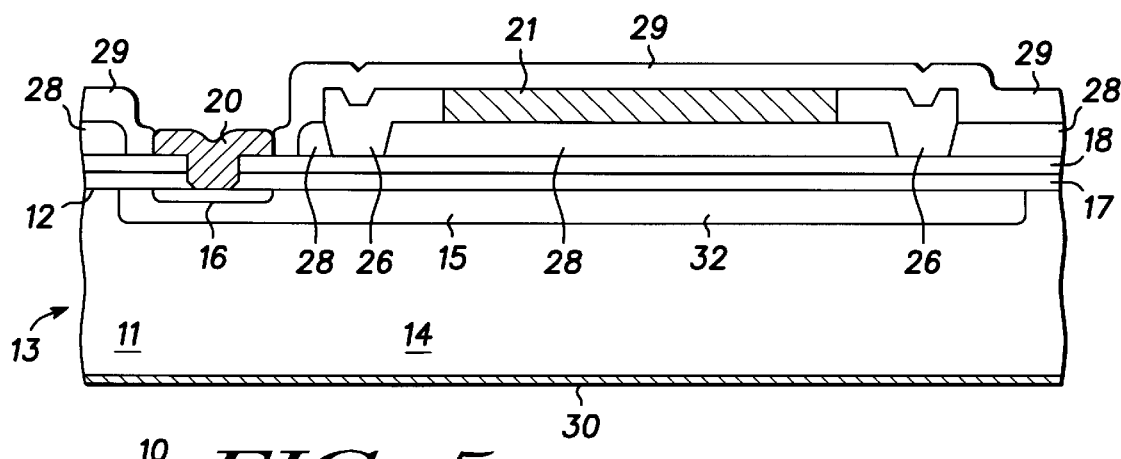

FIGS. 4 and 5 illustrate cross-sectional views of component 10 during fabrication taken along reference line 3—3 of FIG. 1. Substrate 11 is a semiconductor material such as, for example, silicon or gallium arsenide. Substrate 11 can have a resistivity that is suitable for collector region 14, or alternatively, collector region 14 can be formed in substrate 11 using implantation or diffusion techniques known in the art. As an example, when collector region 14 is n-type, phosphorous or arsenic can be used to dope collector region 14 to a resistivity of less than approximately fifty ohm-centimeters. Base region 15 can be implanted or diffused to a depth of greater than approximately five thousand angstroms (Å) within collector region 14. As an example, when base region 15 is p-type, boron can be used to dope base region 15. An emitter region 16 of photodetector 13 is formed to a depth of greater than approximately one thousand angstroms within base region 15 using techniques similar to those used to form base region 15. As an example, when emitter region 16 is n-type, phosphorous or arsenic can be used to dope emitter region 16 to a resistivity lower than either of collector region 14 or base region 15.

Then, dielectric layers 17 and 18 are sequentially formed over surface 12 of substrate 11. Dielectric layer 17 electrically isolates underlying photodetector 13 and is preferably comprised of thermally grown or chemical vapor deposited (CVD) silicon oxide to enhance the manufacturing compatibility between photodetector 13 and circuit 52 (FIG. 1). As discussed hereinafter, dielectric layer 18 is used as an etch stop and as a passivation layer to protect underlying photodetector 13. As an example, when dielectric layer 17 is comprised of silicon oxide, dielectric layer 18 can be comprised of less than approximately two thousand angstroms of silicon nitride that is deposited over dielectric layer 17 using a low pressure CVD technique.

In FIG. 5, a sacrificial layer 28 is formed over dielectric layer 18. The thickness of sacrificial layer 28 determines distance 53 (FIGS. 2 and 3). Sacrificial layer 28 should be a conformal material in order to improve the planarity of seismic mass 21 that is subsequently formed over sacrificial layer 28. Portions of sacrificial layer 28 are etched away to expose a portion of dielectric layer 18 over electrical contact regions including, but not limited to, emitter region 16. Portions of sacrificial layer 28 are also etched away to expose other portions of dielectric layer 18, which serve as anchor sites for seismic mass 21. Although the anchor sites are shown to overlie base region 15, it is understood that the anchor sites for seismic mass 21 can be located outside or beyond base region 15. Dielectric layer 18 serves as an etch stop during the etching of sacrificial layer 28 to protect underlying dielectric layer 17 and photodetector 13. As an example, when dielectric layer 18 is comprised of silicon nitride, sacrificial layer 28 is preferably comprised of a two micron thick layer of phospho-silicate glass (PSG) because PSG is selectively etchable over silicon nitride using a wet fluorine based etchant.

Next, seismic mass 21 is provided or formed over sacrificial layer 28. Seismic mass 21 is preferably comprised of conventional micromachined seismic mass materials to facilitate the manufacturing of component 10. Examples of suitable seismic mass materials include, but are not limited to, polysilicon, aluminum, tungsten, gold, or nickel. When seismic mass 21 is comprised of polysilicon, the polysilicon can be deposited to a thickness of approximately two microns using a low pressure CVD technique known in the art and can be patterned or etched using a chlorine based reactive ion etch. Seismic mass 21 can be patterned or etched using conventional etching techniques that preferably do not significantly etch sacrificial layer 28.

After the patterning or etching of seismic mass 21, another sacrificial layer 29 is formed over seismic mass 21 and sacrificial layer 28. Preferably, sacrificial layers 28 and 29 are similar in composition and thickness to facilitate an even or uniform doping and mechanical stress distribution within seismic mass 21 when seismic mass 21 is comprised of polysilicon. An anneal can be performed to reduce the mechanical stress of seismic mass 21 and to dope the polysilicon of seismic mass 21 by diffusing some of the phosphorous dopant out of sacrificial layers 28 and 29. Doping the polysilicon of seismic mass 21 improves the electrical conductivity of seismic mass 21 for an optional self-testing of component 10 as described hereinafter.

A contact via is etched into sacrificial layer 29 and dielectric layers 17 and 18, and an emitter contact 20 is formed in the contact via using techniques known to those skilled in the art. Emitter contact 20 is preferably comprised of materials that are used for transistor electrode contacts of circuit 52 (FIG. 1) in order to further simplify the manufacturing of component 10. For example, emitter contact 20 can be comprised of aluminum silicon or the like. Although not shown in FIG. 4, it is understood that a base contact for photodetector 13 can be simultaneously formed during the formation of emitter contact 20.

If desired, substrate 11 can be thinned to provide a desirable collector depth and to improve the thermal performance of component 10, and then a collector contact 30 is provided over a back surface of substrate 11. Sacrificial layer 29 protects seismic mass 21 and photodetector 13 during the thinning and backmetal deposition processes. A forming gas anneal can be used as an ohmic contact anneal for emitter contact 20 and collector contact 30.

A sacrificial etch is used to remove sacrificial layers 28 and 29 to form component 10 as shown in FIG. 3. As an example, when sacrificial layers 28 and 29 are comprised of PSG and when dielectric layer 18 is comprised of silicon nitride, a hydrofluoric-based etchant can be used to remove sacrificial layers 28 and 29 while dielectric layer 18 serves as an etch stop layer. However, regardless of the specific chemistry used to etch sacrificial layers 28 and 29, the etchant should not significantly etch seismic mass 21, emitter contact 20, or dielectric layer 18.

Figure 6:
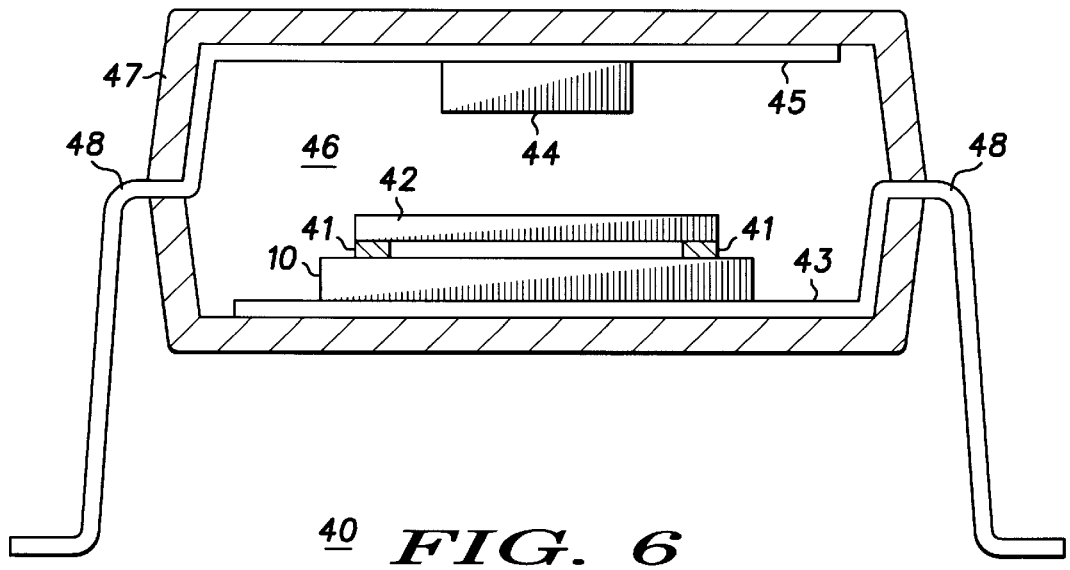
FIG. 6 portrays a cross-sectional schematic view of the optical semiconductor component after packaging in accordance with the present invention.

In FIG. 6, a cross-sectional schematic view of component 10 is shown after packaging. Component 10 is assembled in or is a part of another semiconductor component 40, which also includes a leadframe 48, a protective cap 42, an optically transmissive and electrically insulating packaging material 46, and an optically and electrically insulating packaging material 47. Collector contact 30 (not shown in FIG. 6) of component 10 is mounted on and is electrically coupled to a portion 43 of leadframe 48. Cap 42 is mounted over component 10 using, for example, an oxide layer 41 to adhere cap 42 to component 10 wherein cap 42 protects seismic mass 21 from mechanical damage and prevents subsequently applied packaging material 46 from obstructing the motion of seismic mass 21. Cap 42 is optically transmissive to permit light from light source 44 to be detected by component 10. Light source 44 overlies component 10 and is mounted on a different portion 45 of leadframe 48. As an example, cap 42 can be an optically transmissive quartz substrate, and light source 44 can be a conventionally fabricated light emitting diode comprised of a gallium arsenide p-n junction that emits light having a wave length of approximately 800–1,000 nanometers.

Packaging material 46 is disposed or molded around component 10, cap 42, and light source 44. Packaging material 46 is optically transmissive to optically couple light source 44 and component 10. Packaging material 47 is applied or molded around portions 43 and 45 of leadframe 48 to encapsulate and protect packaging material 46, light source 44, cap 42, and component 10. Packaging material 47 is optically insulative to optically isolate component 10 from the environment. Packaging materials 46 and 47 can be commercially available semiconductor device packaging materials.

Light source 44 is optically coupled to base regions 31, 32, 33, 34, 35, and 36 (FIG. 2) of photodetector 13 wherein holes 22, 23, 24, and 25 of seismic mass 21 are located between light source 44 and base regions 32, 33, 34, and 35. During operation of component 40, light source 44 preferably generates a light beam, and seismic mass 21 acts as a shutter that blocks portions of the light beam. As component 10 is subjected to an acceleration that is approximately parallel to surface 12 (FIG. 1) of substrate 11, seismic mass 21 moves along an axis 27 (FIGS. 1 and 2) relative to substrate 11 and photodetector 13. The motion of seismic mass 21 exposes a greater or lesser amount of base regions 31, 32, 33, 34, and 35 to the light beam from light source 44. When a greater amount of base regions 32, 33, 34, and 35 is exposed to the light beam by holes 22, 23, 24, and 25, respectively, photodetector 13 detects or senses more light and generates a larger output current that is detected by circuit 52 (FIG. 1). When a lesser amount of base regions 32, 33, 34, and 35 is exposed to the light beam by holes 22, 23, 24, and 25, photodetector 13 senses less light and generates a smaller output current that is detected by circuit 52. Therefore, component 10 serves as an optical accelerometer wherein changes in velocity move seismic mass 21 and change the current produced by photodetector 13.

A wave length of the light beam generated by light source 44 is preferably less than width 38 (FIGS. 1 and 2) and length 39 (FIG. 1) of holes, 22, 23, 24, and 25, and distance 53 (FIGS. 2 and 3) is also preferably less than width 38 and length 39 in order to prevent optical interference of the light beam from light source 44 (FIG. 6). Optical interference will distort the light detected by base regions 32, 33, 34, and 35, and the light distortion will degrade the accuracy of component 10. Also, a portion of base regions 32, 33, 34, and 35 preferably remain covered by seismic mass 21 and preferably remain unexposed to the light beam from light source 44 at all times in order to improve the accuracy of component 10. For example, if an increase in a velocity moves seismic mass 21 such that all of base regions 32, 33, 34, and 35 were exposed by holes 22, 23, 24, and 25, respectively, then an additional increase in the velocity would not be able to expose additional portions of base regions 32, 33, 34, and 35 to the light beam from light source 44. Therefore, the additional increase in the velocity would not be detected or sensed by component 10. Accordingly, portions of base regions 32, 33, 34, and 35 preferably remain unexposed to the light beam by holes 22, 23, 24, and 25, respectively. To prevent seismic mass 21 from moving too much or too little in response to a change in velocity, seismic mass 21 preferably has a spring constant of approximately one to ten Newtons per meter.

Figure 7:
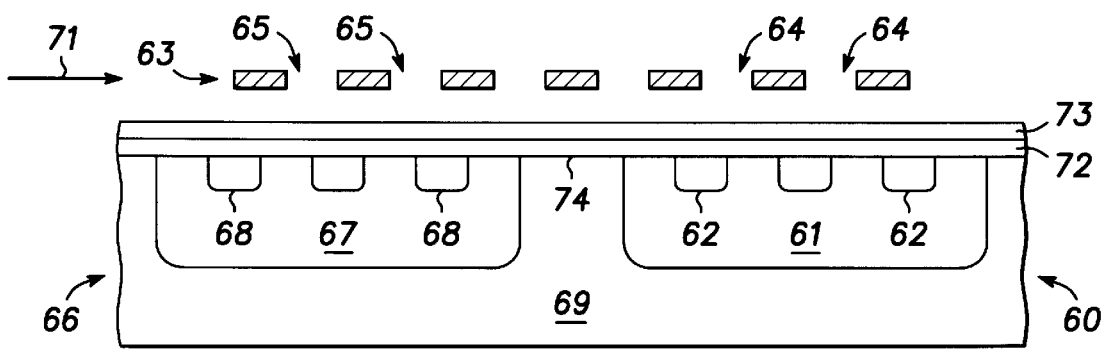
FIG. 7 depicts a cross-sectional view of an alternative embodiment of the optical semiconductor component in accordance with the present invention.

FIG. 7 depicts a cross-sectional view of an alternative embodiment of component 10, which is identified as an optical semiconductor component 70. The process previously described to fabricate component 10 can also be used to fabricate component 70, which includes photodetectors 60 and 66, both of which can be similar to photodetector 13 of component 10. Photodetectors 60 and 66 can be lateral bipolar transistors that have collector regions 61 and 67, respectively, and base regions 62 and 68, respectively. Photodetectors 60 and 66 are formed in and supported by a substrate 69, which can be similar to substrate 11 of component 10.

Dielectric layers 72 and 73 can be similar to dielectric layers 17 and 18, respectively, of FIG. 2. Dielectric layer 73 overlies dielectric layer 72, and dielectric layer 72 overlies a surface 74 of substrate 69. Similar to dielectric layer 18, dielectric layer 73 is preferably used as an etch stop layer to facilitate the manufacturing of component 70.

Component 70 also has a seismic mass 63 that can be similar to seismic mass 21 of component 10. Seismic mass 63 is disposed over or overlies portions of dielectric layers 72 and 73 and photodetectors 60 and 66. Component 70 can optionally have a separate seismic mass overlying each of photodetectors 60 and 66. Seismic mass 63 has holes 65, which overlie portions of base region 68 and collector region 67, and also has holes 64, which overlie portions of base region 62 and collector region 61. As depicted in FIG. 7, holes 65 overlie "left side" portions of base region 68, and holes 64 overlie "right side" portions of base region 62.

Component 70 serves as a differential accelerometer as explained hereinafter. As an acceleration moves seismic mass 63 in a direction indicated by an arrow 71, a greater amount of base region 68 is exposed to a light beam by holes 65 of seismic mass 63, and consequently, photodetector 66 will generate a higher output current. However, when seismic mass 63 moves in the direction indicated by arrow 71, a smaller amount of base region 62 is exposed to the light beam by holes 64 of seismic mass 63. Consequently, photodetector 60 generates a lower current while photodetector 66 generates a higher current. On the other hand, when seismic mass 63 moves in a direction opposite to arrow 71, a smaller amount of base region 68 and a greater amount of base region 62 are exposed to the light beam. Thus, when seismic mass 63 moves in a direction opposite to arrow 71, the output current generated by photodetector 66 decreases while the output current of photodetector 60 increases. The differences in the changes of current generated by photodetectors 60 and 66 can be used by an integrated circuit (not shown in FIG. 7) to more accurately measure the acceleration.

As an example, the integrated circuit can include a differential amplifier, as known in the art, which is coupled to photodetectors 60 and 66. The output currents of photodetectors 60 and 66 typically vary monotonically, but in opposite directions from each other, as seismic mass 63 is displaced by an acceleration along an axis approximately parallel to surface 74. Changes in the output currents as a result of temperature fluctuations, mechanical vibrations, or an acceleration in a plane perpendicular to surface 74 of substrate 69 are substantially canceled out because of the use of the differential photodetector pair and the differential amplifier. To further increase the sensitivity of component 70, each of photodetectors 60 and 66 can be coupled to an additional transistor to form two separate darlington pairs to amplify the output currents generated by photodetectors 60 and 66.

Therefore, in accordance with the present invention, it is apparent there has been provided an improved accelerometer that overcomes the disadvantages of the prior art. The subject optical semiconductor component or optical accelerometer is less sensitive to the planarity of a movable seismic mass compared to the prior art because the seismic mass described herein is used as a shutter or a light blocker and is not sensitive to the exact distance between the seismic mass and an underlying substrate or electrode. The component also has a lower probability of suffering from electrical latching of the seismic mass because the seismic mass and base regions of an underlying photodetector do not have to be electrically biased or at least have a similar potential bias during operation. Furthermore, the component described herein is not significantly affected by misalignment between the seismic mass and the photodetector in the underlying substrate because any misalignment is canceled out during the motion of the seismic mass. Moreover, the component is less temperature sensitive than a capacitive accelerometer and is more sensitive to changes in acceleration compared to a conventional capacitive accelerometer of a similar size.

While the invention has been particularly shown and described with reference to preferred embodiments, it will be understood by those skilled in the art that changes in form and detail may be made without departing from the spirit and scope of the invention. For instance, light source 44 can be pulsed for power conservation considerations. Moreover, component 10 can include an integrated self-test capacitor, as known in the art. During self-testing, seismic mass 21 is electrically biased, and a small capacitance would be measured. Component 10 would not suffer from electrical latching because the self-testing function would not be conducted when component 10 is used to measure acceleration. Accordingly, the disclosure of the present invention is not intended to be limiting. Instead, the disclosure of the present invention is intended to be illustrative of the scope of the invention, which is set forth in the following claims.

I claim:

1. An optical semiconductor component comprising:
   a substrate comprised of a semiconductor;
   a first region in the substrate, the first region having a first conductivity type;
   a second region in the substrate, the second region having a second conductivity type different from the first conductivity type, the second region adjacent to the first region;
   a third region in the substrate, the third region having the first conductivity type;
   a fourth region in the substrate, the fourth region having the second conductivity type and adjacent to the third region; and
   a structure overlying a portion of the first region, a portion of the second region, a portion of the third region, and a portion of the fourth region, the structure physically mounted on the substrate, the structure being movable in a direction substantially parallel to the substrate to simultaneously cover greater portions of the first and fourth regions and smaller portions of the second and third regions, and the structure being opaque.

2. The optical semiconductor component of claim 1 wherein the optical semiconductor component is an accelerometer.

3. The optical semiconductor component of claim 1 further comprising an electrically insulating layer overlying a portion of the substrate wherein the structure has a hole wherein the hole overlies a different portion of the second region when the optical semiconductor component is devoid of acceleration, wherein the structure covers the portion of the second region when the optical semiconductor component is devoid of acceleration, wherein the hole has a width and a length, and wherein a portion of the structure is separated from the electrically insulating layer by a distance wherein the length and the width of the hole are greater than the distance.

4. The optical semiconductor component of claim 1 further comprising a bipolar transistor in the substrate wherein the first region is a collector region of the bipolar transistor and wherein the second region is a base region of the bipolar transistor.

5. A semiconductor component comprising:
   a substrate having a surface, the substrate comprised of a semiconductor;
   a first photodetector supported by the substrate, wherein the first photodetector is a bipolar transistor having a base region and a collector region located along different portions of the surface of the substrate;
   a second photodetector supported by the substrate, the second photodetector having a base region and a collector region located along different portions of the surface of the substrate;
   a seismic mass overlying the surface of the substrate wherein the seismic mass is movable along an axis substantially parallel to the surface of the substrate, wherein the seismic mass is optically insulative, and wherein a movable portion of the seismic mass completely circumscribes the first hole, wherein the first hole of the seismic mass overlies a first portion of the base region of the first photodetector and a first portion of the collector region of the first photodetector when the semiconductor component is at rest, wherein the seismic mass covers a second portion of the base region of the first photodetector and a second portion of the collector region of the first photodetector when the semiconductor component is at rest, wherein the seismic mass has a second hole overlying a first portion of the base region of the second photodetector and overlying a first portion of the collector region of the second photodetector when the semiconductor component is at rest, wherein the seismic mass covers a second portion of the base region of the second photodetector and a second portion of the collector region of the second photodetector when the semiconductor component is at rest, wherein the movable portion of the seismic mass completely circumscribes the second hole, wherein the first and second holes of the seismic mass simultaneously move in a direction along the axis in response to an acceleration force to simultaneously cover a greater portion of the base region of the first photodetector, a smaller portion of the collector region of the first photodetector, a smaller portion of the base region of the second photodetector, and a greater portion of the collector region of the second photodetector; and an optically conductive cap overlying the substrate.

6. The semiconductor component of claim 5 wherein the bipolar transistor of the first photodetector has a plurality of base regions along different portions of the surface of the substrate and wherein the seismic mass has a plurality of holes, each of the plurality of holes simultaneously overlying a different portion of the collector region of the first photodetector and each of the plurality of holes overlying a portion of a different one of the plurality of base regions of the first photodetector.

7. The semiconductor component of claim 6 wherein a distance from a center of a first one of the plurality of holes to a center of a second one of the plurality of holes is approximately equal to a distance from a center of a first one of the plurality of base regions to a center of a second one of the plurality of base regions wherein the first one of the plurality of base regions is adjacent to the second one of the plurality of base regions and wherein the first one of the plurality of holes is adjacent to the second one of the plurality of holes and wherein the first one of the plurality of holes overlies a portion of the first one of the plurality of base regions and wherein the second one of the plurality of holes overlies a portion of the second one of the plurality of base regions.

8. The semiconductor component of claim 5 further comprising an integrated circuit supported by the substrate and adjacent to the first photodetector wherein the integrated circuit is electrically coupled to the first photodetector.

9. The semiconductor component of claim 5 further comprising a dielectric layer overlying a portion of the first photodetector wherein the first hole of the seismic mass has a width and a length and wherein a distance separates the first hole of the seismic mass from the dielectric layer wherein the distance is less than the width and the length of the first hole.

10. The semiconductor component of claim 5 further comprising a light source optically coupled to the second portion of the first photodetector wherein the first hole of the seismic mass is between the light source and the second portion of the first photodetector.

11. The optical semiconductor component of claim 1 wherein structure has a hole overlying a different portion of the first region and a different portion of the second region and wherein a portion of the structure completely defines the hole, is movable with respect to the substrate, and is substantially planar.

12. The optical semiconductor component of claim 1 further comprising a cap over the substrate wherein the cap covers the first and second regions and the structure and wherein the cap is comprised of an optically transmissive material.

13. The optical semiconductor component of claim 12 further comprising:

a optically conductive encapsulant covering the cap; and an optically insulative encapsulant around the optically conductive encapsulant, the cap, and the substrate.

14. The optical semiconductor component of claim 1 wherein the structure has a plurality of holes, each of the holes symmetric with each other, and the plurality of holes simultaneously overlying a different portion of the first region, a different portion of the second region, a different portion of the third region, and a different portion of the fourth region.

15. The optical semiconductor component of claim 1 wherein the structure is smaller than the substrate.

16. The semiconductor component of claim 5 wherein the movable portion of the seismic mass is substantially planar, the movable portion of the seismic mass defining the first hole, and wherein the substrate is larger than the seismic mass.

17. A differential accelerometer comprising:

a semiconductor substrate with a surface;

first and second doped regions in the surface of the semiconductor substrate wherein the first and second doped regions are spatially separated from each other and wherein centers of the first and second doped regions are separated by a first distance; and a seismic mass physically coupled to the surface of the semiconductor substrate, wherein a movable portion of the seismic mass is movable in a direction substantially parallel to the surface of the semiconductor substrate in response to an acceleration of the semiconductor component, wherein the seismic mass is optically opaque, wherein the seismic mass has first and second holes completely defined by the movable portion of the seismic mass, wherein the first and second holes are substantially symmetrical to each other, wherein centers of the first and second holes are separated by a second distance substantially equal to the first distance, wherein the first hole overlies a first portion of the first doped region when the semiconductor component is at rest, wherein the second hole overlies a first portion of the second doped region when the semiconductor component is at rest, wherein the seismic mass covers second portions of the first and second doped regions when the semiconductor component is at rest, wherein the first and second portions of the first doped region are contiguous with each other, wherein the first and second portions of the second doped region are contiguous with each other, and wherein the first hole overlies a greater portion of the first doped region and the second hole overlies a smaller portion of the second doped region when the semiconductor component is subject to an acceleration.

18. The differential accelerometer of claim 17 further comprising a dielectric layer between the surface of the semiconductor substrate and the seismic mass wherein the first and second holes of the seismic mass each have a length and a width and wherein the movable portion of the seismic mass is separated from the dielectric layer by a distance wherein the lengths and the widths of the first and second holes of the seismic mass are each greater than the distance.

\* \* \* \* \*